United States Patent
Lee et al.

(10) Patent No.: US 9,187,064 B2
(45) Date of Patent: Nov. 17, 2015

(54) WIPER LEVER ASSEMBLY AND WIPER BLADE

(71) Applicants: Hyundai Motor Company, Seoul (KR); Kia Motors Corporation, Seoul (KR); ASMO Co., Ltd., Kosai, Shizuoka-Ken (JP)

(72) Inventors: Ki Young Lee, Gyeonggi-Do (KR); Dong Soo Lee, Gyeonggi-Do (KR); In Kwang Lee, Busan (KR); In Gue Cha, Gyeonggi-Do (KR); Heui Geon Lee, Gyeonggi-Do (KR); Amano Shinichirou, Shizuoka (JP)

(73) Assignees: Hyundai Motor Company, Seoul (KR); Kia Motors Corporation, Seoul (KR); Asmo Co., Ltd., Shizuoka-ken (JP)

( * ) Notice: Subject to any disclaimer, the term of this patent is extended or adjusted under 35 U.S.C. 154(b) by 185 days.

(21) Appl. No.: 13/829,006

(22) Filed: Mar. 14, 2013

(65) Prior Publication Data

US 2013/0276255 A1    Oct. 24, 2013

(30) Foreign Application Priority Data

Apr. 24, 2012 (JP) .................. 2012-098830

(51) Int. Cl.
*B60S 1/38* (2006.01)
*B60S 1/34* (2006.01)

(52) U.S. Cl.
CPC ............. *B60S 1/3436* (2013.01); *B60S 1/3801* (2013.01); *B60S 1/3879* (2013.01); *B60S 2001/3815* (2013.01)

(58) Field of Classification Search
CPC ............... B60S 1/3801; B60S 1/3436; B60S 2001/3813; B60S 2001/3815

USPC ............ 15/250.44–250.48, 250.32
See application file for complete search history.

(56) References Cited

U.S. PATENT DOCUMENTS 5,289,608 A    3/1994 Kim
5,546,627 A    8/1996 Chen
(Continued)

FOREIGN PATENT DOCUMENTS

FR    2486890 A  *  1/1982 ............... B60S 1/38
GB    2 139 528 A    11/1984
(Continued)

OTHER PUBLICATIONS

FR2486890 (machine translation), 1982.*
(Continued)

*Primary Examiner* — Mark Spisich
*Assistant Examiner* — Andrew A Horton
(74) *Attorney, Agent, or Firm* — Mintz Levin Cohn Ferris Glovsky and Popeo, P.C.; Peter F. Corless

(57) ABSTRACT

Disclosed is a wiper lever assembly that includes upper and lower levers, a plurality of pivotal connecting parts that are pivotally coupled to a longitudinal end of the upper lever, and a plurality of mating pivotal connecting parts that are disposed on the lower lever. The assembly further includes an upper pressing arc portion disposed on the upper lever over the plurality of pivotal pressing parts. The upper pressing arc is in slidable contact with a lower engaging arc portion disposed on the lower lever. In addition, a radius of curvature of a concave arc of the upper pressing arc portion and the lower engaging arc portion is larger than that of a convex arc of the upper pressing arc portion and the lower engaging arc portion.

4 Claims, 10 Drawing Sheets

(56) References Cited

U.S. PATENT DOCUMENTS

| | | |
|---|---|---|
| 2009/0293218 A1 | 12/2009 | Fujiwara et al. |
| 2011/0162161 A1 | 7/2011 | Amado |
| 2013/0227808 A1 | 9/2013 | Lee et al. |

FOREIGN PATENT DOCUMENTS

| | | | | |
|---|---|---|---|---|
| JP | 59-213547 A | | 12/1984 | |
| JP | H04-108470 U | | 9/1992 | |
| JP | 2000-203391 A | | 7/2000 | |
| JP | 2000203391 A | * | 7/2000 | ............. B60S 1/34 |
| JP | 2003-127840 A | | 5/2003 | |
| JP | 2005-206122 A | | 8/2005 | |
| JP | 2006021650 A | | 1/2006 | |
| JP | 2007-055589 A | | 3/2007 | |
| JP | 2008-168796 A | | 7/2008 | |
| JP | 2010-018273 A | | 1/2010 | |
| JP | 2011251567 A | * | 12/2011 | ............. B60S 1/38 |
| JP | 2012-121367 A | | 6/2012 | |
| KR | 1020000069488 A | | 11/2000 | |
| KR | 1020080094204 A | | 10/2008 | |
| KR | 1020080099013 A | | 11/2008 | |
| KR | 1020120039111 A | | 4/2012 | |
| WO | 2010/035794 A1 | | 4/2010 | |
| WO | 2013/080694 A1 | | 6/2013 | |

OTHER PUBLICATIONS

JP2000203391 (machine translation), 2000.*

* cited by examiner

WIPER LEVER ASSEMBLY AND WIPER BLADE

REFERENCE TO RELATED APPLICATIONS

This application claims foreign priority to Japanese Patent Application No. 2012-098830, filed on Apr. 24, 2012.

BACKGROUND OF THE INVENTION

1. Field of the Invention

The present invention relates to a wiper lever assembly and a wiper blade.

2. Description of the Related Art

Among conventional wiper blades, a particular wiper blade is known which comprises a wiper lever assembly composed of an upper lever, having a lower lever coupled to the upper lever to pivotally connect the longitudinal center of the lower lever to a longitudinal end of the upper lever to form a tournament shape, and a backing and a blade rubber, both of which are gripped by the wiper lever assembly.

This type of conventional wiper lever assembly includes a lower lever, and an upper lever having an outer top wall and a pair of outer lateral walls (having an inverted U-shaped section) to substantially cover the lower cover, wherein the pair of outer lateral walls are elastically deformed to enlarge the area between the pair of outer lateral walls and the lower lever is fitted between the pair of outer lateral walls during the assembling operation of the wiper lever assembly. In this wiper lever assembly, a plurality of shaft apertures are formed in the pair of outer lateral walls of the upper lever, and a pivot shaft is formed on the lower lever and protrudes outwardly in a lateral direction. When the lower lever is fitted between the pair of outer lateral walls, the pivot shaft is fitted in the shaft apertures to pivotally connect the lower lever to the upper lever.

The wiper lever assembly prevents the lower lever from being separated when the upper lever is lifted upwardly, and transmits a downward pushing force supplied from the upper lever to the lower lever, only by provision of the pivot shaft and the shaft apertures. However, in this configuration is may be difficult to form a slanted surface on the pivot shaft due to the lack of a secure engagement between the pivot shaft and the shaft aperture.

SUMMARY

Accordingly, the present invention provides a wiper lever assembly and a wiper blade which are capable of preventing separation of a lower lever from an upper lever and transmitting a pushing force from an upper lever to a lower lever.

The present invention provides a wiper lever assembly including: upper and lower levers, wherein the lower lever includes a lower engaging arc portion; a pair of pivotal connecting parts pivotally coupled to each of opposite longitudinal ends of the upper lever; a pair of mating pivotal connecting parts, wherein the lower engaging arc portion is disposed on the lower lever, and wherein the pair of pivotal connecting parts are fitted; and an upper pressing arc portion disposed on the upper lever over the pair of pivotal pressing parts, and wherein the upper pressing arc portion is in slidable contact with the lower engaging arc portion disposed on the lower lever; wherein a radius of curvature of a concave arc of one of the upper pressing arc portion and the lower engaging arc portion is set to be larger than that of a convex arc of the upper pressing arc portion and the lower engaging arc portion, and the pivotal connecting parts do not engage with any of upper and lower areas of the mating pivotal connecting parts while the upper pressing arc portion engages with the lower engaging arc portion.

Each pivotal connecting part may have an inclined surface as an end surface to allow the pair of pivotal connecting parts to be fitted to the mating pivotal connecting parts.

The lower lever may include a top wall and a pair of lateral walls downwardly extended from opposite lateral sides of the top wall, in which a region of the top wall to which the upper lever is coupled includes an elongated aperture which is longitudinally elongated, and the pair of lateral walls are perforated to form the mating pivotal connecting parts, wherein the upper lever includes an insert connecting member, which is downwardly extended from the longitudinal end of the upper lever and includes an approximate rectangular insert tube comprising a pair of opposite lateral walls which face the pair of lateral walls, respectively, and a pair of end walls connecting longitudinal ends of the pair of lateral walls to each other, and wherein the pivotal connecting parts protrude from the longitudinal center of the pair of lateral walls and are fitted to the mating pivotal connecting parts.

The lower lever may include a top wall and a pair of lateral walls downwardly extended from opposite lateral sides of the top wall, in which the pair of lateral walls are perforated to form the mating pivotal connecting parts, and the pair of lateral walls include at lower portions thereof the lower engaging arc portions which are extended laterally and outwardly, and wherein the upper lever comprises an outer top wall and a pair of outer lateral walls to allow a longitudinal end portion of the upper lever to cover the top wall and the pair of lateral walls of the lower lever, in which the outer lateral walls include the pivotal connecting parts which protrude laterally and inwardly and are fitted to the mating pivotal connecting parts, and the pair of outer lateral walls include, at bottom ends thereof, the upper pressing arc portions which protrude downwardly.

Furthermore, the present invention provides a wiper blade including: a wiper lever assembly disclosed in any of the above disclosures; and a backing and a blade rubber which are gripped by the wiper lever assembly.

BRIEF DESCRIPTION OF THE DRAWINGS

The above and other objects, features and advantages of the present invention will be more clearly understood from the following detailed description taken in conjunction with the accompanying drawings, in which.

Figure 1:
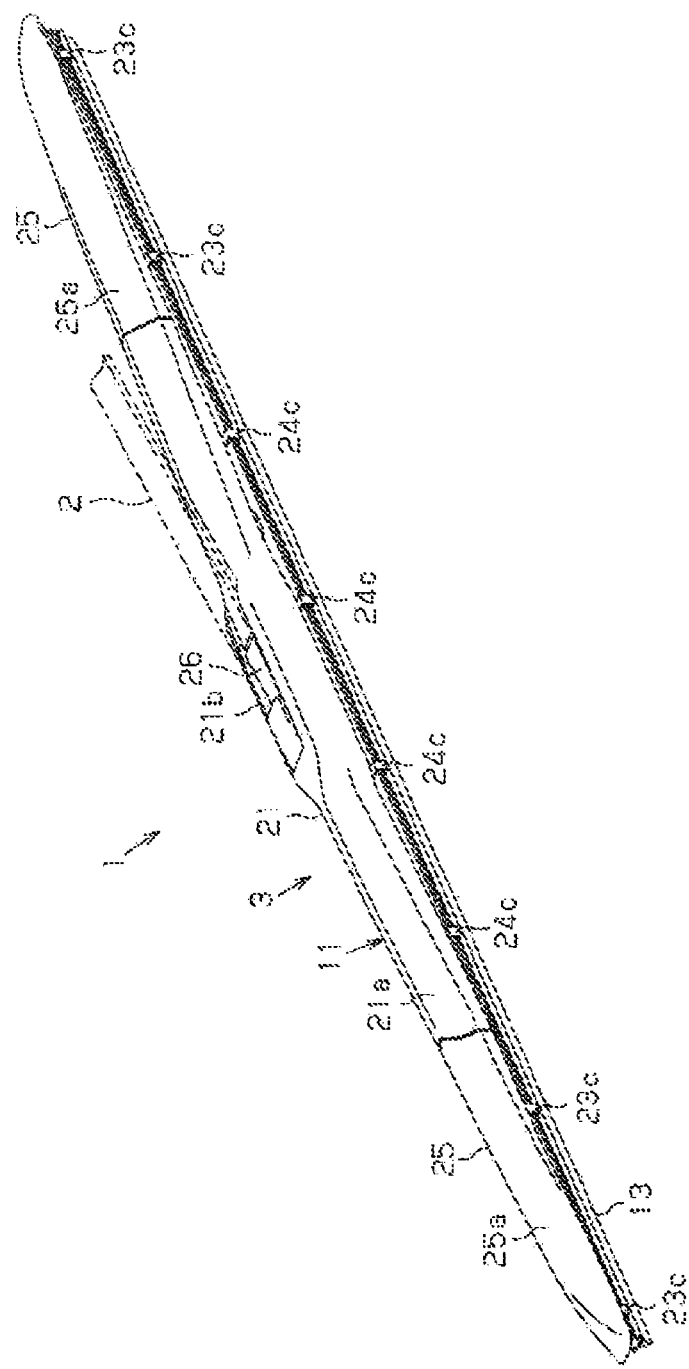
FIG. 1 is an exemplary view of an vehicle wiper according to an exemplary embodiment of the present invention.

| Reference Numerals | |
|---|---|
| 11: wiper lever assembly | 12: backing |
| 13: blade rubber | 22, 51: secondary lever (upper lever) |
| 22b: insert connecting member | 22c: opposite lateral walls |
| 22d: end wall | 22e: insert tube |
| 22f, 51c: pivotal connecting pin (pivotal connecting part) | |
| 22g, 51e: inclined surface | |
| 22h: upper pressing arc portion (concave arc portion) | |
| 23, 24, 52: yoke lever (lower lever) | |
| 23a, 24a, 52a: top wall | 23b, 24b, 52b: lateral wall |
| 23c, 24c: grip portion | 23d, 24d: elongated aperture |
| 23e, 24e, 52c: pivotal connecting aperture (mating pivotal connecting part) | |
| 23g, 24g: lower engaging arc portion (convex arc portion) | |
| 51a: outer top wall | 51b: outer lateral wall |
| 51d: upper pressing arc portion (convex arc portion) | |
| 52d: lower engaging arc portion (concave arc portion) | |

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, exemplary embodiments of the present invention will be described in detail with reference to FIGS. 1 to 6.

As shown in FIG. 1, an vehicle wiper 1 according to an exemplary embodiment of the present invention, which is configured to wipe away rain drops that adhere to a wiping surface of a windshield of a vehicle, may comprise a wiper arm 2, and a wiper blade 3 coupled to the wiper arm 2. The wiper arm 2 may have a proximal end fixed to a pivot shaft (not shown) that is rotated back and forth within a predetermined angular range by the driving force of a wiper motor (not shown), and thus the wiper arm 2 may swing back and forth by the back and forth rotation of the pivot shaft. Furthermore, the wiper arm 2 may be biased at a distal end toward the windshield (e.g., wiping surface) by a biasing mechanism (not shown).

Figure 2:
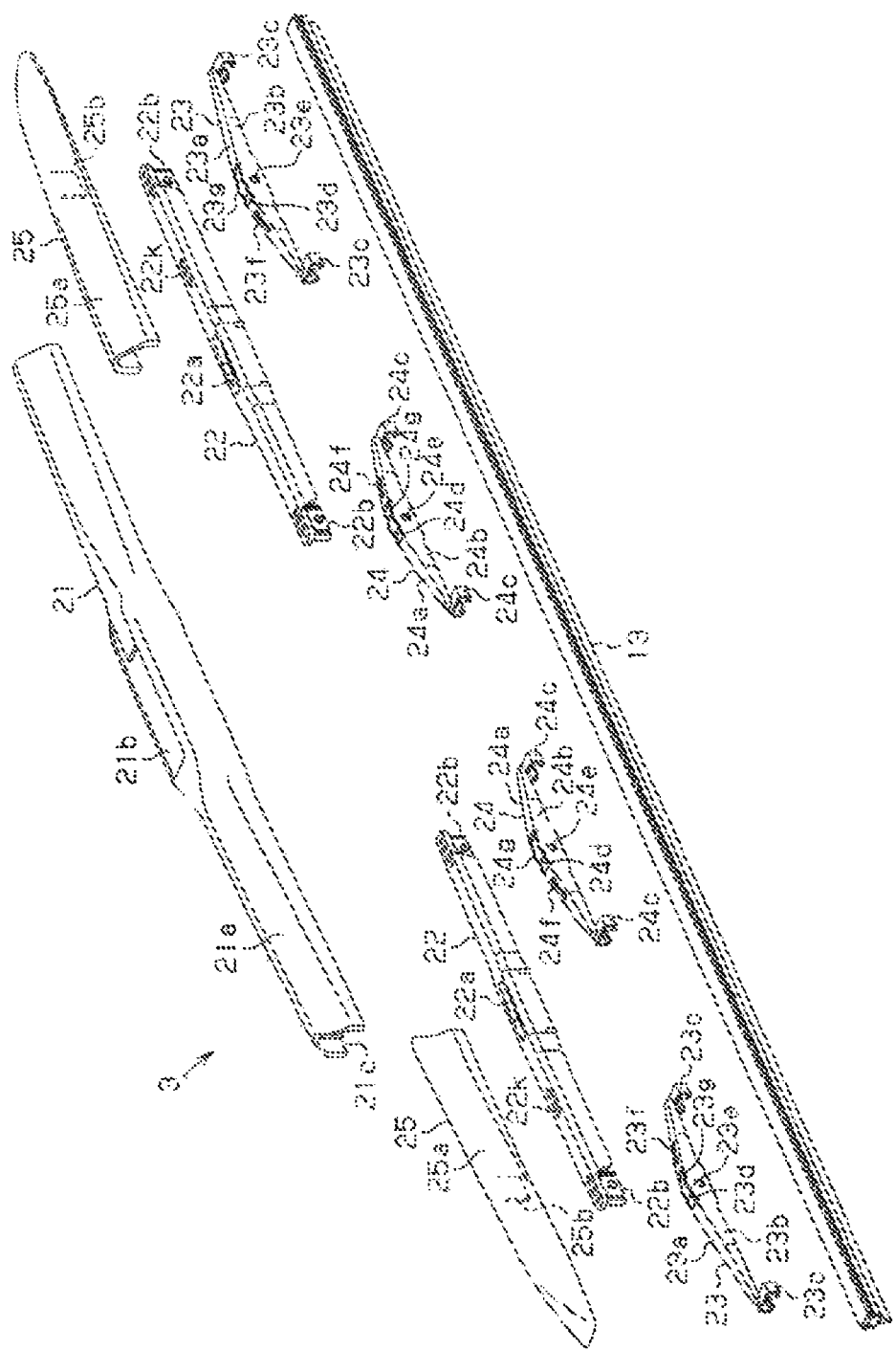
FIG. 2 is an exemplary detailed view of the wiper blade according to an exemplary embodiment of the present invention.

A wiper blade 3 may be coupled to the distal end of the wiper arm 2. The wiper blade 3 may comprise a wiper lever assembly 11, and a plurality of backings 12 (see FIG. 3D) and a blade rubber 13, both of which are gripped by the wiper lever assembly 11). In addition, the wiper lever assembly 11 may comprise an upper lever, having a lower lever coupled to the upper lever to pivotally connect a longitudinal end of the upper lever to a longitudinal center of the lower lever. More specifically, the wiper lever assembly 11 according to the embodiment of the present invention may include a lever member including a center cover lever 21, a pair of secondary levers 22, four yoke levers 23, 24, and a pair of cases 25, as shown in FIG. 2.

Figure 3A:
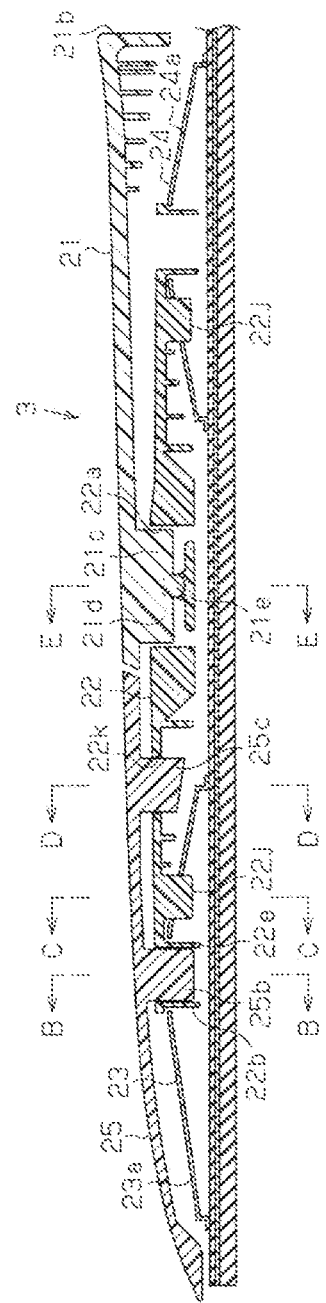
FIG. 3A is an exemplary cross-sectional view of the wiper blade according to an exemplary embodiment of the present invention.
Figure 3B:
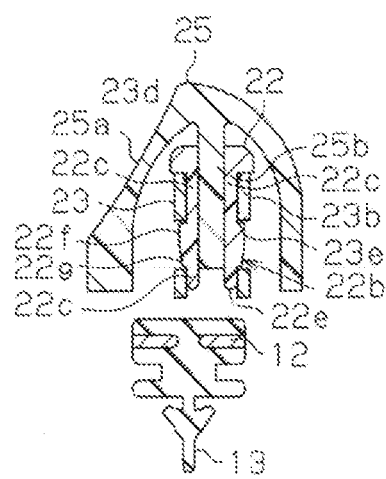
FIG. 3B is an exemplary cross-sectional view taken along a line B-B in FIG. 3A according to an exemplary embodiment of the present invention.

The center cover lever 21, which is made of a resin material, may be configured to have an approximate inverted U-shaped transverse section. The center cover lever 21 is disposed on substantially the entire area of a front surface (except an intermediate area) with a fin portion 21a that converts wind pressure applied to a traveling vehicle into a pushing force against the wiping surface (see FIGS. 2 and 3E). In addition, the center cover lever 21 includes a clip connection opening 21b formed at the center portion of its length, and a clip 26 disposed under the opening 21b and pivotally coupled to a transverse pin and to which the distal end of the wiper arm 2 is removably mounted as shown in FIG. 1. Furthermore, the center cover lever 21 may include a plurality of center connectors 21c formed at the opposite ends thereof (see FIGS. 3 and 3E). As shown in FIGS. 3 and 3E, each center connecting member 21c may comprise a plate-shaped portion 21d which protrudes downwardly from an inner surface of the center cover lever 21, and a center shaft portion 21e which protrudes in a width direction from the longitudinal center of a lower surface of the plate-shaped portion 21d. Each secondary lever 22 may be pivotally connected at the longitudinal center thereof to the opposite ends (e.g., the center connecting members 21c) of the center cover lever 21.

Figure 3C:
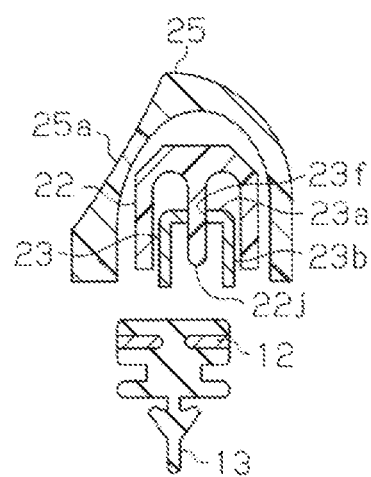
FIG. 3C is an exemplary cross-sectional view taken along a line C-C in FIG. 3A according to an exemplary embodiment of the present invention.
Figure 3D:
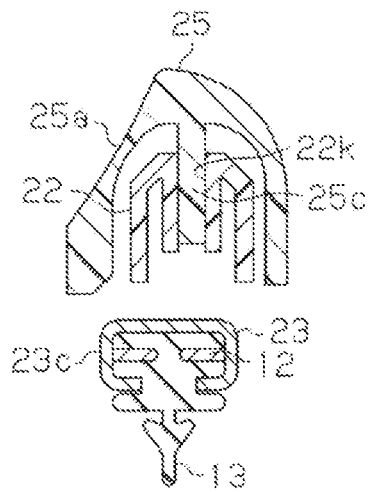
FIG. 3D is an exemplary cross-sectional view taken along a line D-D in FIG. 3A according to an exemplary embodiment of the present invention.
Figure 3E:
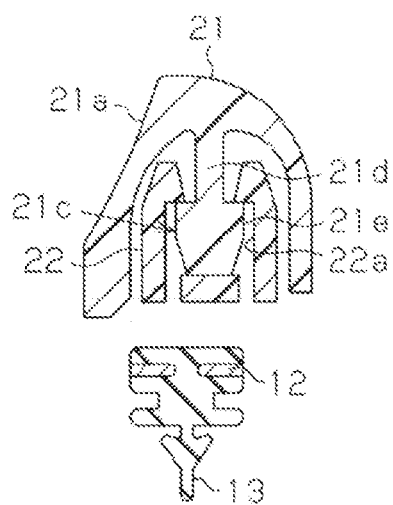
FIG. 3E is an exemplary cross-sectional view taken along a line E-E in FIG. 3A according to an exemplary embodiment of the present invention.

The secondary lever 22, which is made of a resin material, may be configured to have an approximate inverted U-shaped transverse section (see FIG. 3C). As shown in FIGS. 2 and 3A to 3E, the longitudinal center of the secondary lever 22 may include a connecting aperture 22a, in which the center connecting member 21c may be fitted, thus enabling the secondary lever 22 to be pivotally connected to the center cover lever 21 and to be rotated about the center shaft portion 21e.

The secondary lever 22 may be disposed at opposite ends with the yoke levers 23, 24 to pivotally connect each of the opposite ends of the secondary lever 22 to the longitudinal center of the corresponding yoke lever 23 or 24.

Figure 4:
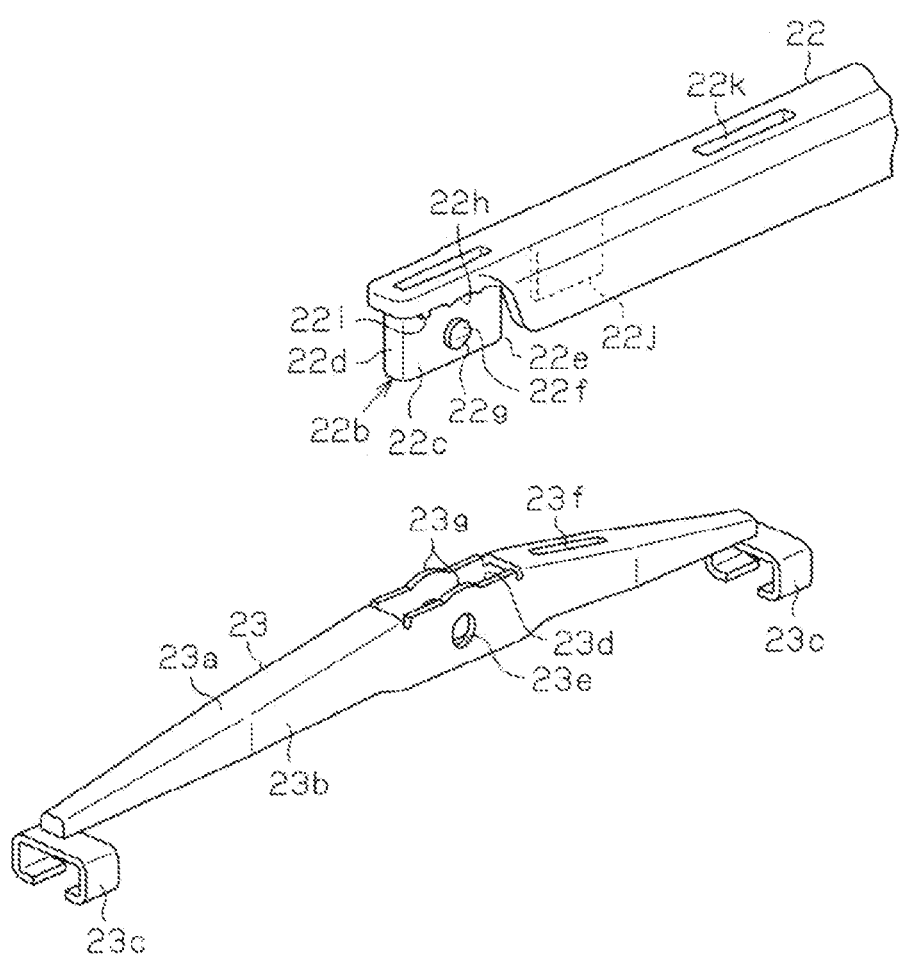
FIG. 4 is an exemplary detailed view of a wiper lever assembly according to an exemplary embodiment of the present invention.
Figure 5A:
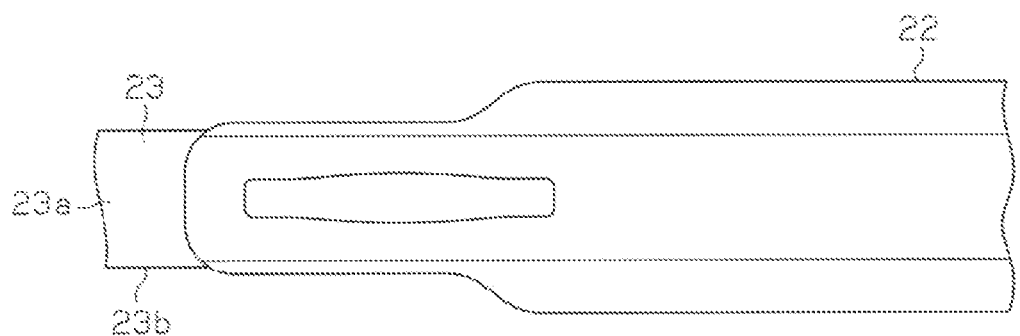
FIG. 5A is an exemplary detailed view of the wiper lever assembly according to an exemplary embodiment of the present invention.
Figure 5B:
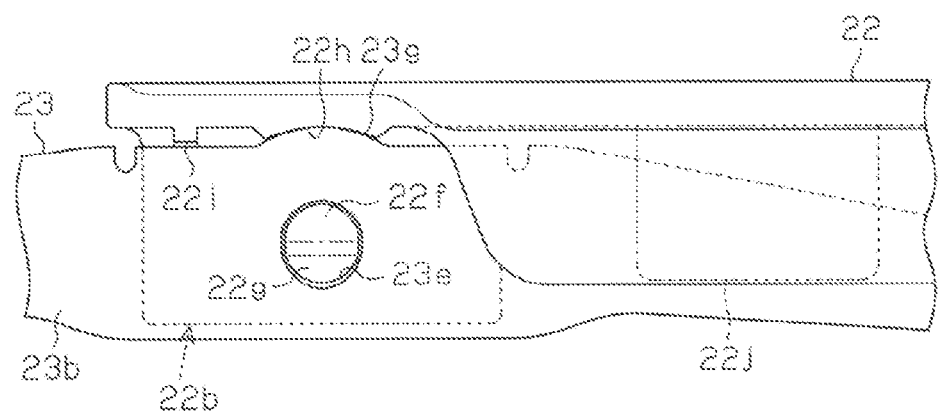
FIG. 5B is an exemplary detailed side view of the wiper lever assembly according to an exemplary embodiment of the present invention.

More specifically, as shown in FIGS. 2 to 5, each of the yoke levers 23, 24, made of a metallic material, may be configured to have approximate substantially inverted U-shaped transverse section, and may include a top wall 23a or 24a and a pair of lateral walls 23b or 24b which protrudes downwardly from both lateral sides of the top wall 23a or 24a. Each of the yoke levers 23, 24 may further include a plurality of grip portions 23c, 24c that grip a backing 12 and the blade rubber 13. Each of the longitudinal centers of the top walls 23a, 24a may include an elongated aperture 23d or 24d which is extended in a longitudinal direction of the yoke lever 23 or 24 as viewed from above. Each of the elongated apertures 23d, 24d may have the same width as that of the top walls 23a, 24a, to divide each of the top walls 23a, 24a in a longitudinal direction. Each of longitudinal centers of the lateral walls 23b, 24b may include a pivotal connecting aperture 23e or 24e. As shown in FIGS. 5B and 6, each of the pivotal connecting apertures 23e, 24e may include an upper and a lower arc section and a pair of parallel linear sections connected between the opposite ends of the upper arc section and the opposite ends of the lower arc section as viewed in an axis direction of the connecting aperture. Each of the top walls 23a, 24a may include a support aperture 23f or 24f at a location inside the longitudinal center of the top wall 23a or 24a (an area covered with the secondary lever 22), in which the support aperture 23f or 24f is extended longitudinally as viewed from above.

As shown in FIG. 4, at the opposite ends of the secondary lever 22, the top wall among the inverted U-shaped walls is extended longitudinally, and the extended top wall portion may include an insert connecting member 22b which is extended downwardly and inserted and fitted to the elongated apertures 23d, 24d from above.

Figure 5C:
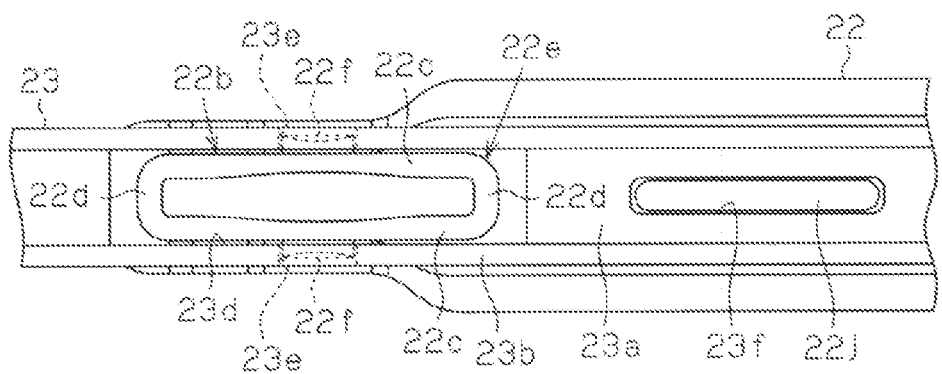
FIG. 5C is an exemplary detailed bottom view of the wiper lever assembly according to an exemplary embodiment of the present invention.
Figure 6:
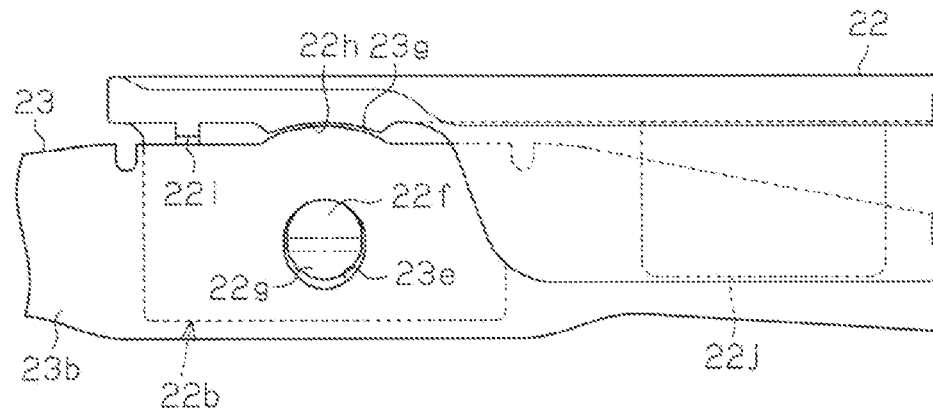
FIG. 6 is an exemplary detailed side view of the wiper lever assembly according to an exemplary embodiment of the present invention.

As shown in FIGS. 4 and 5C, the insert connecting member 22b may comprise a pair of opposite lateral walls 22c which are extended parallel to each other to face inner surfaces of the pair of lateral walls 23b or 24b, and a pair of end walls 22d connecting ends of the opposite lateral walls 22c, to allow the insert connecting member 22b to include a rectangular insert tube 22e which is extended longitudinally as viewed from below. In addition, as shown in FIGS. 4 and 5, the insert connecting member 22b may include a plurality of pivotal connecting pins 22f which laterally protrude from the longitudinal center of the pair of opposite lateral walls 22c and may be fitted to the pivotal connecting apertures 23e or 24e to operate as a pivotal center. Each of the pivotal connecting pins 22f may include an upper and a lower arc section and a pair of parallel linear sections connected between the opposite ends of the upper arc section and the opposite ends of the lower arc section, as viewed in a transverse section of the pivotal connecting pin 22f. The pivotal connecting pin 22f may include a lower inclined surface 22g on a lower area of an end face thereof, wherein the lower inclined surface 22g is inclined downwardly and inwardly. The pivotal connecting pin 22f may further include an upper flat surface formed on the end face above the lower inclined surface 22g, and a curved surface may be connected between the upper vertical flat surface and the lower inclined surface 22g. Furthermore, inserting the pivotal connecting pin 22f into the pivotal connecting aperture 23e, 24e, allows a pivot action of the yoke lever 23, 24 with respect to the longitudinal end of the secondary lever 22 while the downward separation of the yoke lever 23, 24 due to upward lift of the secondary lever 22 may be inhibited. Specifically, when the secondary lever 22 (or the case 25) is lifted while the blade rubber 13 is adhered to a wiping surface due to freezing, an upper outer surface of the pivotal connecting pin 22f may engage with an upper inner surface of the pivotal connecting aperture 23e, 24e, to inhibit the downward separation of the yoke lever 23, 24, thus causing the yoke lever 23, 24 to lift, as shown in FIG. 6.

As shown in FIG. 5B, the secondary lever 22 (e.g., the extended top wall) may include an upper pressing arc portion 22h disposed above the pivotal connecting pins 22f, wherein the upper pressing arc portion 22h is shaped to be concave upwardly. Meanwhile, the yoke levers 23, 24 may include lower engaging arc portions 23g, 24g above the pivotal connecting apertures 23e, 24e, wherein the lower engaging arc portions 23g, 24g are shaped to be upwardly convex. The upper pressing arc portion 22h may be disposed on the lower engaging arc portions 23g, 24g to allow the upper pressing arc portion 22h to slidable contact the lower engaging arc portions 23g, 24g. As a result, the pivot movement of the yoke levers 23, 24 with respect to the longitudinal end of the secondary lever 22 may be allowed, and the downward pushing force from the secondary lever 22 may be transmitted to the yoke levers 23, 24.

The radius of curvature of the upper pressing arc portion 22h (e.g., the radius of curvature of the arc defined by the upper pressing arc portion 22h) may be larger than that of the lower engaging arc portions 23g, 24g (e.g., the radius of curvature of the arc defined by the lower engaging arc portions 23g, 24g). As shown in FIG. 5B, when the upper pressing arc portion 22h engaged with the lower engaging arc portions 23g, 24g, the pivotal connecting pins 22f do not engage with any of upper and lower inner surfaces of the pivotal connecting apertures 23e, 24e. As shown in FIG. 6, when the secondary lever 22 (or the case 25) is lifted, the pivotal connecting pins 22f may engage with the upper inner surface of the pivotal connecting apertures 23e, 24e while the upper pressing arc portion 22h may be spaced apart from the lower engaging arc portion 23g, 24g.

As shown in FIG. 5C, the longitudinal center portions of the pair of opposite lateral walls 22c may have a thickness less than that of longitudinal ends of the pair of opposite lateral walls 22c. According to this embodiment, the variance in thickness of the pair of opposite lateral walls may allow the longitudinal center portions of the pair of opposite lateral walls 22c to bend inwardly to an amount of displacement exceeding the protruding length of the pivotal connecting pins 22f. In other words, the thickness of the longitudinal center portion of each of the pair of opposite lateral walls 22c allows a distance between the opposite longitudinal center portions to be substantially equal to or more than twice the protruding length of each of the pivotal connecting pins 22f. According to the above configuration, the secondary lever 22 and the yoke lever 23, 24 may be pivotably coupled to each other by fitting the insert connecting member 22b into the elongated aperture 23d, 24d from above. More specifically, as the insert connecting member 22b and the lower inclined surface 22g are inserted into the elongated aperture 23d, 24d from above, the longitudinal center portions of the pair of opposite lateral walls 22c may be bent toward each other, and the pivotal connecting pins 22f may be fitted into the pivotal connecting apertures 23e, 24e (e.g., the bent states of the longitudinal center portions are relaxed), thereby completing the coupling operation of the yoke levers 23, 24 to the secondary levers 22.

As shown in FIG. 5B, the secondary lever 22 (e.g., the extended top wall) may include a pivot limit protrusion 22i to limit the pivoting movement of the yoke lever 23, 24 with respect to the secondary lever 22 within a predetermined range. The pivot limit protrusion 22i may be configured to limit an outward pivoting movement of the yoke lever 23, 24 with respect to the secondary lever 22 (e.g., a clockwise pivoting movement in FIG. 5B) to a position in which the backing 12 and the blade rubber 13 gripped by the grip portions 23c, 24c may be disposed parallel to the secondary lever 22 (e.g., a position in which the pivot limit protrusion 22i engages with the yoke lever 23, 24).

As shown in FIGS. 3C and 5C, the secondary lever 22 may include a plurality of support walls 22j which are fitted in the support apertures 23f, 24f of the yoke levers 23, 24 and may engage with the yoke levers 23, 24 in a width direction to reduce lateral movement of the yoke levers 23, 24 with respect to the secondary lever 22. The dimensions of the support wall 22j may allow the yoke levers 23, 24 to pivot with respect to the secondary lever 22 while the support wall 22j is fitted in the support apertures 23f, 24f.

As shown in FIGS. 1, 3A, 3C and 3D, the secondary lever 22 may include the case 25 as a part of the secondary lever 22 which protrudes from the center cover lever 21. The case 25, which may be made of a resin material, may have a substantially inverted U-shaped transverse section. The case 25 may be disposed on substantially the entire area of a front surface with a fin portion 25a to convert wind pressure applied to a traveling vehicle into a pushing force against the wiping surface (see FIGS. 3B to 3D). The fin portion 25a may be connected to the fin portion 21a of the center cover lever 21.

As shown in FIGS. 3A and 3B, the case 25 may include with a plurality of flex resistant plates 25b, which protrude from an inner surface of the case 25 and are fitted to the insert connecting members 22b (e.g., the insert tubes 22e). As shown in FIGS. 3A and 3D, the case may further include a plurality of fitting plates 25c, which protrude from the inner surface of the case 25 and are fitted to fitting apertures 22k formed at the top wall of the secondary lever 22. Accordingly, the case 25 may be coupled to the secondary lever 22 by the flex resistant plates 25b fitted to the insert connecting members 22b (e.g., the insert tubes 22e) and the fitting plates 25c fitted to the fitting apertures 22k, as shown in FIGS. 3A, 3B and 3D. In addition, the case 25 may be coupled to the secondary lever 22 by the flex resistant plates 25b fitted to the insert connecting members 22b (e.g., the insert tubes 22e), flex of the pair of opposite lateral walls 22c, that is, the displacement of the pivotal connecting pins 22f is suppressed, as shown in FIG. 3B.

Operations of the vehicle wiper 1 according to the embodiment of the present invention will now be explained.

In the vehicle wiper 1, the distal end of the wiper arm 2 may be biased against a windshield (e.g., wiping surface) by a biasing mechanism (not shown), and the pushing force may be transmitted to the blade rubber 13 via the clip 26, the center cover lever 21, the secondary lever 22 and the yoke levers 23, 24. Thus, the blade rubber 13 may contact a windshield over substantially the entire length. While the vehicle is in motion, the wind pressure applied to the fin portions 21a, 25a may be converted into a pushing force against the windshield (e.g., wiping surface), thus causing the blade rubber 13 to come into contact with the windshield. Consequently, when the wiper atm 2 pivotally swings around the pivot shaft, the desirable wiping action is obtained.

Hereinafter, the effects of the embodiment of the present invention will be described.

(1) Since the pair of pivotal connecting pins 22f are fitted in the pivotal connecting apertures 23e, 24e, a pivot action of the yoke lever 23, 24 with respect to the longitudinal end of the secondary lever 22 is allowed while the downward separation of the yoke lever 23, 24 due to upward lift of the secondary lever 22 is inhibited. Furthermore, since the upper pressing arc portion 22h slidably contacts the lower engaging arc portions 23g, 24g at a position different from the position of the pivotal connecting pin 22f and the pivotal connecting aperture 23e, 24e, the pivot movement of the yoke lever 23 with respect to the longitudinal end of the secondary lever 22 is allowed, and the downward pushing force from the secondary lever 22 may be transmitted to the yoke levers 23, 24. Furthermore, since a part configured to prevent the yoke lever 23, 24 from being separated downwardly when the secondary lever 22 is lifted upwardly and a part configured to transmit a downward pushing force supplied from the secondary lever 22 to the yoke lever 23, 24 are disposed at positions different from each other, the optimal configurations for respective parts may be achieved. For example, rigidity or durability of the respective parts may be optimized. In addition, since the pair of pivotal connecting pins 22f and the pair of pivotal connecting apertures 23e, 24e do not transmit the pushing force, it may be possible to reduce, for example, an area of a lower surface of the pivotal connecting pin 22f (e.g., an area of a surface perpendicular to the vertical line). Accordingly, the respective end faces of the pivotal connecting pins 22f may have lower inclined surfaces 22g which are inclined downwardly and inwardly to allow fitting of the pair of pivotal connecting pins 22f into the pivotal connecting apertures 23e, 24e, as in the above embodiment. As a result, for example, assembly ease of the wiper lever assembly may be improved.

In addition, since the radius of curvature of the upper pressing arc portion 22h, which is concave upwardly, may be larger than that of the lower engaging arc portions 23g, 24g, which is convex upwardly, a frictional resistance occurring in a slidable contact therebetween may be reduced, thus allowing a pivot action of the yoke lever 23, 24 with respect to the longitudinal end of the secondary lever 22, 24. Furthermore, since the pivotal connecting pin 22f does not come into contact with the upper and lower areas of the pivotal connecting apertures 23e, 24e when the upper pressing arc portion 22h engages with the lower engaging arc portions 23g, 24g, assembly defects may be prevented. Furthermore, since no frictional resistance occurs between the pivotal connecting pin and the pivotal connecting aperture during the slidable contact, a pivot action of the yoke lever 23, 24 with respect to the secondary lever 22 may be facilitated.

(2) To fit the pair of pivotal connecting pins 22f into the pivotal connecting apertures 23e, 24e, the end face of the pivotal connecting pin 22f include the inclined surface 22g, which is inclined inwardly and upwardly or downwardly (e.g., inwardly and downwardly in the embodiment). Consequently, a fitting operation of the pair of pivotal connecting pins 22f into the pivotal connecting apertures 23e, 24e, and thus an assembling operation of the yoke levers 23, 24 to the secondary levers 22 may be facilitated.

(3) The insert connecting member 22b of the secondary lever 22 may comprise a pair of opposite lateral walls 22c which face the inner surfaces of the pair of lateral walls 23b, 24b of the yoke levers 23, 24, and a pair of end walls 22d connecting ends of the opposite lateral walls 22c, to include a rectangular insert tube 22e in the insert connecting member 22b, wherein the rectangular tube 22e is extended longitudinally as viewed from below. Consequently, the pair of opposite lateral walls 22c of the insert connecting member 22b may bend at the longitudinal center portions thereof due to the extended structure. As a result, as the longitudinal center portions of the pair of opposite lateral walls 22 bend inwardly, the pivotal connecting pins 22f protruding from the center portions may be displaced inwardly, to allow the insert connecting member 22b to be fitted to the elongated aperture 23d, 24d of the yoke lever 23, 24. Subsequently, by inserting the pivotal connecting pins 22f into the pivotal connecting apertures 23e, 24e of the yoke lever 23, 24 (e.g., by releasing the bent conditions of the pair of opposite lateral walls 22c), the yoke lever 23, 24 may be coupled to the secondary lever 22. Furthermore, since the pair of opposite lateral walls 22c of the insert connecting member 22b may have a substantially large length (e.g., even without an increase in their height) a substantial bending deformation of the longitudinal center portions may be assured, thus, the height of insert connecting member 22b does not need to increase to obtain an increased bending deformation. In other words, where the secondary lever has a top wall and a pair of lateral walls to define a substantially U-shaped section to cover the yoke lever, a height of the secondary lever may increase to cause a larger elastic deformation of the pair of lateral walls of the secondary lever and thus a larger expansion of the opening defined between the pair of lateral walls. According to the embodiment of the present invention, the increase in a height of the secondary lever may be avoided, which may provide a suppression of a height increase of a wiper blade 3 and an improved appearance.

In addition, since a region of the pair of opposite lateral walls 22c of the insert connecting member 22b (e.g., the insert tube 22e) which faces the lateral walls 23b, 24b of the pair of yoke lever 23, 24 may be increased longitudinally, a movement in a wiping direction (e.g., a movement in a width direction perpendicular to the longitudinal direction) of the yoke lever 23, 24 with respect to the secondary lever 22 may be reduced. Furthermore, even though a load in a wiping direction is applied between the secondary lever 22 and the yoke lever 23, 24, the load may not be locally applied to the longitudinal center portion (e.g., the pivotal connecting pin 22f) of the pair of opposite lateral walls 22c. Furthermore, a separation of the yoke lever 23, 24 from the secondary lever 22 may be suppressed due to the increased bending deformation of the longitudinal center portion.

(4) Since the longitudinal center portions of the pair of opposite lateral walls 22c have a thickness less than that of the longitudinal end portions of the pair of opposite lateral walls 22c, the longitudinal center portions bend by a decreased force, and an amount of bending deformation may increase, thus increasing an amount of inward displacement of the pivotal connecting pins 22f. As a result, an operation of coupling the yoke lever to the secondary lever may be facilitated. Moreover, since the longitudinal end portions of the pair of opposite lateral walls 22c have a thickness larger than that of the longitudinal center portions of the lateral walls 22c, an increased overall rigidity of the insert connecting member 22b (e.g., the insert tube 22e) may be achieved in addition to the above-mentioned effects.

(5) Since the flex resistant plate 25b is fitted to the insert tube 22e of the insert connecting member 22b while the insert connecting member 22b is fitted to the elongated aperture, to suppress flex of the pair of opposite lateral walls 22c, separation of the pivotal connecting pins 22f from the pivotal connecting apertures 23e due to the flex of the pair of opposite lateral walls 22c may be prevented. Consequently, accidents in which the separation of the yoke lever 23 from the secondary lever 22 may be reduced.

(6) The flex resistant plate 25b is used as the flex resistant member which is fitted to the insert tube 22e to suppress flex of the pair of the pair of opposite lateral walls 22c, wherein the flex resistant plate 25b is disposed in the case 25 covering the secondary lever 22. Accordingly, as compared to when the flex resistant member is prepared separately, the number of required components and the number of fabrication processes may be reduced.

(7) The secondary lever 22 includes the support wall 22j, which is disposed at a position more distant than the longitudinal ends of the opposite lateral walls 22c as viewed from the pivotal connecting pins 22f and faces the lateral walls of the yoke lever 23, 24 (e.g., the inner surfaces of the support aperture 23f, 240 to reduce lateral movement of the yoke lever 23, 24 with respect to the secondary lever 22. Consequently, the lateral movement (e.g., the movement in a wiping direction) of the yoke lever 23, 24 with respect to the secondary lever 22 may be further reduced. In addition, even though a lateral load (e.g., a load in a wiping direction) may be applied between the secondary lever 22 and the yoke lever 23, 24, the load may not be applied to the insert connecting member 22b including therein the opposite lateral walls 22c equipped with the pivotal connecting pins 22f. As a result, accidents in which the yoke lever 23, 24 is separated from the secondary lever 22 may be reduced.

(8) Since the secondary lever 22 includes the pivot limit protrusion 22i which engages with the yoke lever 23, 24 to limit a pivot action of the yoke lever 23, 24 with respect to the secondary lever 22 within a predetermined range, the yoke lever 23, 24 may not be pivoted beyond a particular location with respect to the secondary lever 22. Consequently, for example, when a rock back is released (e.g., when the blade rubber 13 lifted from the wiping surface is restored to the normal position on the wiping surface), increase in impact on the wiping surface due to a swinging action of the yoke lever 23, 24 may be suppressed.

(9) Since the secondary lever 22 may be made of a resin material, the insert connecting member 22b may be shaped while assuring the desirable flexibility of the opposite lateral walls 22c and reducing the weight of products. In addition, since the yoke lever 23, 24 may be made of a metallic material and includes grip portions 23c 24c for gripping the backing 12 and the blade rubber 13, the overall size of the products may be decreased (e.g., the thickness of the grip portions 23c, 24c may be reduced) and the backing 12 and the blade rubber 13 may be securely gripped.

The embodiment of the present invention may be modified as follows.

Figure 7A:
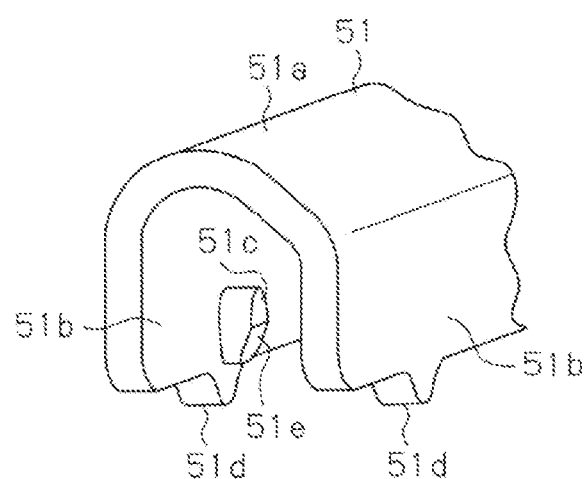
FIG. 7A is an exemplary view of a longitudinal end of a secondary lever according to an exemplary embodiment of the present invention.
Figure 7B:
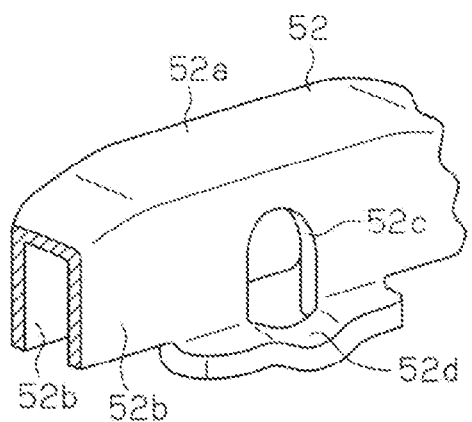
FIG. 7B is an exemplary view of a longitudinal center portion of a yoke lever according to the an exemplary embodiment of the present invention.

The wiper blade may include a longitudinal end of a secondary lever 51 configured to cover the center portion of a yoke lever 52, for example, as shown in FIG. 7. More specifically, as shown in FIG. 7B, the yoke lever 52 may operate as a lower lever of the wiper blade (e.g., wiper lever assembly) and may include a top wall 52a and a pair of lateral walls 52b extended downwardly from lateral sides of the top wall 52a. Pivotal connecting apertures 52c may be formed at the lateral walls 52b of the yoke lever 52, and under the pivotal connecting apertures 52c the yoke lever 52 may include lower engaging arc portions 52d which may be laterally and outwardly extended and may be concave downwardly.

As shown in FIG. 7A, the secondary lever 51 may operate as an upper lever and may include an outer top wall 51a and a pair of outer lateral walls 51b to cover the top wall 52a and the pair of lateral walls 5b of the yoke lever 52 at a longitudinal end portion thereof. The lateral walls of the secondary lever 51 may include pivotal connecting pins 51c that protrude inwardly and may be fitted to the pivotal connecting apertures 52c. The lateral walls 51b may include upper pressing arc portions 51d under the pivotal connection pins 51c, wherein the lateral walls 51b may be convex downwardly. of the end faces of each pivotal connecting pin 51c may include an inclined surface 51e which is inclined inwardly and upwardly or downwardly (e.g., inwardly and downwardly in this modification) to allow the pair of pivotal connecting pins 51c into the to be fitted to pivotal connecting apertures 52c.

Figure 7C:
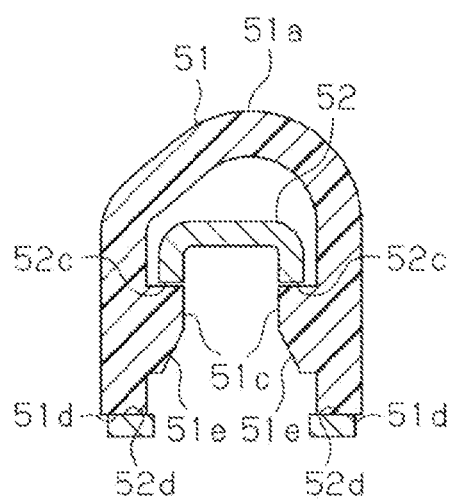
FIG. 7C is an exemplary cross-sectional view of a wiper lever assembly according to an exemplary embodiment of the present invention.

As shown in FIG. 7C, by the fitting of the pivotal connecting pins 51c into the pivotal connecting apertures 52c, a pivot action of the yoke lever 52 with respect to the secondary lever 51 may be allowed while a downward separation of the yoke lever 52 due to lift of the secondary lever 51 may be inhibited. Furthermore, since the upper pressing arc portion 51d of the secondary lever 51 may be disposed on the lower engaging arc portion 52d of the yoke lever 52 for slidable contact therewith, a pivot action of the yoke lever 52 with respect to the longitudinal end of the secondary lever 51 may be allowed, and a downward load from the secondary lever 51 may be transmitted to the yoke lever 52.

The radius of curvature of the lower engaging arc portion 52d may be larger than that of the upper pressing arc portions 51d. As shown in FIG. 7C, when the upper pressing arc portion 51d engages with the lower engaging arc portions 52d, the pivotal connecting pins 51c may not engage with any of upper and lower inner surfaces of the pivotal connecting apertures 52c.

This embodiment which is configured as described above may achieve the same effects as the effects (1), (2) described above. Furthermore, by this configuration, an infiltration of foreign substances such as dust into a clearance between the pivotal connecting pins 51c and the pivotal connecting apertures 52c may be prevented.

Although that the above description discloses that each of the pivotal connecting pins 22f, 51c may include an inclined surface 22g, 51e, on each end, the pivotal connecting pin may be modified into a pivotal connecting pin having no the inclined surface 22g, 51e, without limitation. Additionally, the pair of opposite lateral walls 22c may have a uniform thickness. The flex resistant plate 25b may not be fitted to the insert tube 22e of the insert connecting member 22b to suppress the flex of the pair of opposite lateral walls 22c. Additionally, the flex resistant plate 25b, may be manufactured separately from the case 25.

Moreover, the pivot limit protrusion 22i disposed on the yoke lever 23, 24 instead of the secondary lever 22 or alternatively, it may be eliminated. The secondary lever 22 and the yoke lever 23, 24 may be made of the same material, for example, the secondary lever 22 and the yoke lever 23, 24 may be made of various types of resin materials. Additionally, the center cover lever 21 and the case 25 may not include the fin portions 21a, 25a. Alternatively, the case 25 may be eliminating, thereby exposing a part of the yoke lever. Furthermore, the present invention may be applied between the uppermost lever (e.g., the center cover lever 21) and the underlying lower lever (e.g., the secondary lever 22), without limitation.

What is claimed is:

1. A wiper lever assembly, comprising:
   an upper lever and a lower lever, wherein the lower lever includes a plurality of lower engaging arc portions;
   a plurality of pivotal connecting parts pivotally coupled to each of opposite longitudinal ends of the upper lever;
   a plurality of mating pivotal connecting parts disposed on the lower lever, wherein the plurality of pivotal connecting parts are fitted; and
   a plurality of upper pressing arc portions disposed on the upper lever over the plurality of pivotal connecting parts, wherein the upper pressing arc portions are in slidable contact with the lower engaging arc portions;
   wherein one of the upper pressing arc portions and the lower engaging arc portions include a concave arc, the other of the upper pressing arc portions and the lower engaging arc portions includes a convex arc, a radius of curvature of the concave arc is larger than a radius of curvature of the convex arc, and the pivotal connecting parts do not engage with the upper and lower areas of the mating pivotal connecting parts while the upper pressing arc portions engage with the lower engaging arc portions wherein the lower lever includes:
   a top wall; and
   a plurality of lateral walls downwardly extended from opposite lateral sides of the top wall, wherein each of the plurality of lateral walls are disposed at lower portions thereof with a respective one of the lower engaging arc portions which are each extended laterally and outwardly, and wherein the upper lever includes:
   an outer top wall; and
   a plurality of outer lateral walls to allow a longitudinal end portion of the upper lever to cover the top wall and the plurality of lateral walls of the lower lever, wherein the outer lateral walls include the pivotal connecting parts which protrude laterally and inwardly and are fitted to the mating pivotal connecting parts, and each are disposed at bottom ends thereof with a respective one of the upper pressing arc portions which each protrude downwardly.

2. The wiper lever assembly of claim 1, wherein each pivotal connecting part includes on its end surface an inclined surface to allow the plurality of pivotal connecting parts to be fitted to the mating pivotal connecting parts.

3. The wiper level assembly of claim 1, wherein the upper lever includes:
   an insert connecting member downwardly extended from the longitudinal end of the upper lever, wherein the insert connecting member includes a substantially rectangular insert tube having a plurality of opposite lateral walls which face the plurality of lateral walls, respectively, and a plurality of end walls connecting longitudinal ends of the plurality of lateral walls to each other, and
   wherein the pivotal connecting parts protrude from the longitudinal center of the plurality of lateral walls and are fitted to the mating pivotal connecting parts.

4. A wiper blade comprising:
   a wiper lever assembly including:
   an upper lever and a lower lever, wherein the lower lever includes a plurality of lower engaging arc portions;
   a plurality of pivotal connecting parts pivotally coupled to each of opposite longitudinal ends of the upper lever;
   a plurality of mating pivotal connecting parts disposed on the lower lever, wherein the plurality of pivotal connecting parts are fitted; and
   a plurality of upper pressing arc portions disposed on the upper lever over the plurality of pivotal connecting parts, wherein the upper pressing arc portions are in slidable contact with the lower engaging arc portions;
   wherein one of the upper pressing arc portions and the lower engaging arc portions includes a concave arc, the other of the upper pressing arc portions and the lower engaging arc portions includes a convex arc, a radius of curvature of the concave arc is larger than a radius of curvature of the convex arc, and the pivotal connecting parts do not engage with the upper and lower areas of the mating pivotal connecting parts while the upper pressing arc portions engage with the lower engaging arc portions, wherein the lower lever includes:
   a top wall; and
   a plurality of lateral walls downwardly extended from opposite lateral sides of the top wall, wherein each of the plurality of lateral walls are disposed at lower portions thereof with a respective one of the lower engaging arc portions which are each extended laterally and outwardly, and wherein the upper lever includes:

an outer top wall; and a plurality of outer lateral walls to allow a longitudinal end portion of the upper lever to cover the top wall and the plurality of lateral walls of the lower lever, wherein the outer lateral walls include the pivotal connecting parts which protrude laterally and inwardly and are fitted to the mating pivotal connecting parts, and each are disposed at bottom ends thereof with a respective one of the upper pressing arc portions which each protrude downwardly; and a backing and a blade rubber which are gripped by the wiper lever assembly.

* * * * *